Feb. 27, 1923.
F. G. ALBORN
1,446,441
LAMP MOUNTING FOR VEHICLES
Filed May 10, 1920
2 sheets-sheet 1
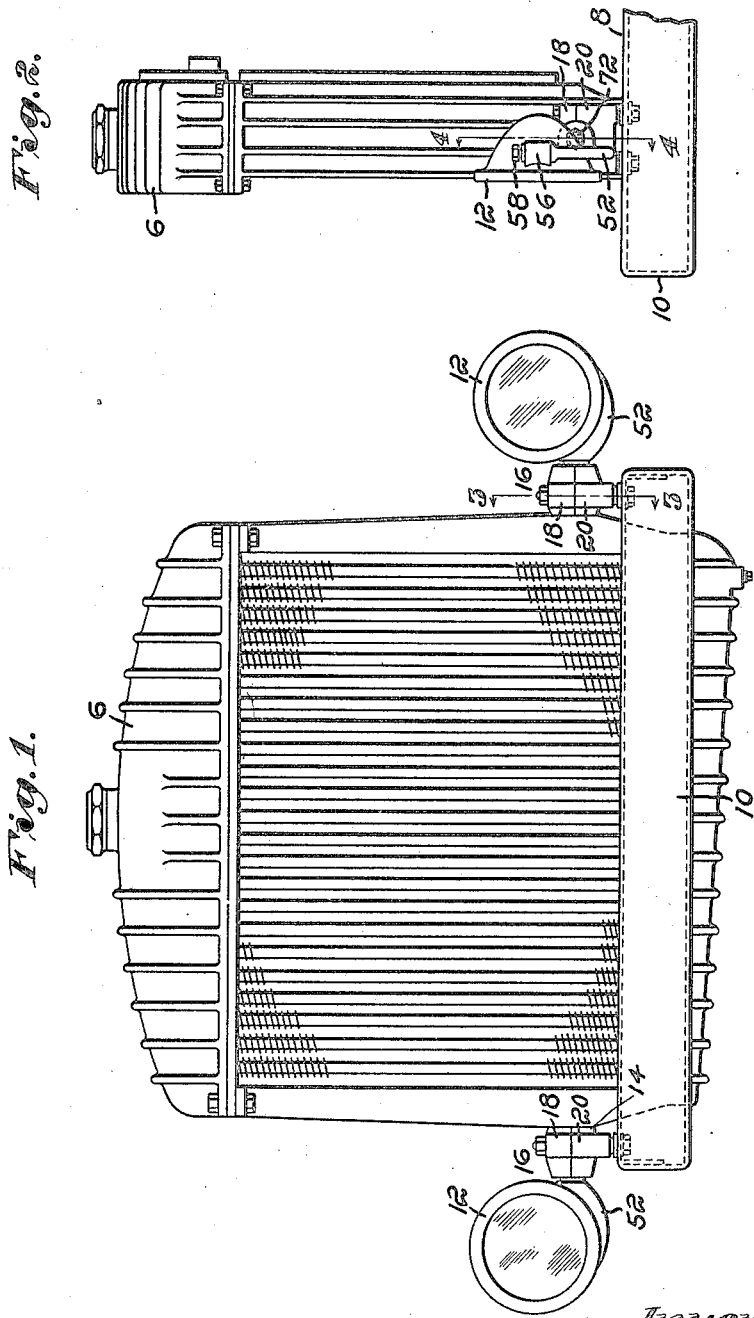

Feb. 27, 1923.

F. G. ALBORN 1,446,441

LAMP MOUNTING FOR VEHICLES

Filed May 10, 1920  2 sheets-sheet 2

Inventor:
Frans G. Alborn,
by Emery, Booth, Janney & Varney
Attys.

Patented Feb. 27, 1923.

1,446,441

UNITED STATES PATENT OFFICE.

FRANS G. ALBORN, OF MILFORD, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

LAMP MOUNTING FOR VEHICLES.

Application filed May 10, 1920. Serial No. 380,192.

*To all whom it may concern:*

Be it known that I, FRANS G. ALBORN, a citizen of the United States, and a resident of Milford, in the county of New Haven and State of Connecticut, have invented an Improvement in Lamp Mountings for Vehicles, of which the following description, in connection with the accompanying drawings, is a specification, like characters on the drawings representing like parts.

This invention relates to vehicle lamp mountings, and aims to provide means to cushion the lamps to protect them from shocks due to unevenness of roads, and further to provide for adjustment of the lamps to enable their beams to be brought to bear upon desired parts of the roadway.

My invention will be best understood by reference to the following description, when taken in connection with the accompanying drawings of one illustrative embodiment thereof, while its scope will be more particularly pointed out in the appended claims.

In the drawings:

Fig. 1 is a front elevation of a portion of a motor vehicle equipped with lamps and mountings therefor exemplifying my invention;

Fig. 2 is an elevation of the same viewed from the right-hand side of Fig. 1;

Figure 3:
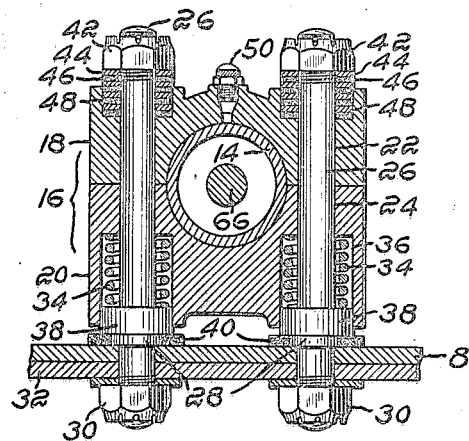
Fig. 3 is a sectional view on an enlarged scale on line 3—3 of Fig. 1.

Referring to the drawings, and to the embodiment of my invention which I have selected for exemplification, I have shown the front portion of a motor vehicle having a radiator 6, which may be of any usual or desired construction, supported on the chassis frame, the latter herein comprising a pair of longitudinal members 8 and a transverse member 10. It should be understood, of course, that the radiator is intended to form a part of the cooling system of the power plant, and may be the condenser of a steam system, or the cooler for the jacket water of an internal combustion engine. The vehicle is equipped with a pair of lamps 12, which may be, and are herein, usual headlights. The mountings, which I will now describe, are common to the radiator and the headlights.

The radiator is herein provided with a pair of axially-aligned, horizontal trunnions 14 (see Fig. 1), mounted to turn in trunnion bearings 16, each comprising upper and lower bearing members 18 and 20 (see Fig. 3). This construction permits the radiator to swing to and fro about the common axis of the trunnions. It is usual to provide a rod connected to the upper portion of the radiator, to prevent undue forward and backward displacement of the radiator, but this is not shown herein, because it forms no part of my invention.

Suitable cushioning means are interposed between the trunnion bearings 14 and the chassis frame to relieve shocks which would otherwise be transmitted to the radiator and lamps, and herein the construction is such as to allow the cushioning means to take care of frame distortion, by allowing the upper and lower bearing members 18 and 20 to separate in opposition to the cushioning means. In the present example, the upper and lower bearing members are provided with pairs of aligned openings 22 and 24, to receive vertical guide rods or studs 26, while the latter are provided with shoulders 28, which rest upon the frame members and are held firmly seated thereon by nuts 30 threaded onto the lower ends of the studs. Preferably, the frame is suitably reinforced at this point, as by the provision of a reinforcing member 32.

Herein, the trunnion bearings are suitably supported, as by helically coiled springs 34, encircling the studs 26. Preferably, these springs are completely housed to protect them from injury, as well as from the action of dust, water and other foreign matter, and to this end, the lower bearing member is provided with a pair of spring chambers 36, in which said springs are seated. The lower ends of these chambers are closed by annular enlargements, or collars, 38 on the studs 26, said enlargements having a working fit in their respective chambers, and providing abutments for the lower ends of the springs. Suitable clearance is provided below the bearing members 20 to allow the latter to move toward the frame in opposition to the springs. Preferably, cushioning means are provided to limit the downward movement of the bearing members, such means herein comprising yielding washers 40 conveniently formed of leather, or other suitable substance, the same encircling the shoulders 28, and being held between the annular enlargements 38 and the frame member 8. Thus it is evident that these washers act also as buffers for the bearing member to strike, in case the springs should yield sufficiently to allow the bearing member to descend that far.

Upward movement of the trunnion bearings is limited by stops conveniently in the form of nuts 42 threaded onto the upper ends of the studs 26. Preferably, the upward movement is cushioned by suitable means, and herein I have provided for this purpose a plurality of buffer washers 44, alternating with metallic washers 46 encircling the studs 26 beneath the nuts 42. The buffer washers may be made of suitable cushioning material, such as cork, or cork composition, which is found to give good results in service, and possesses a considerable amount of resiliency, so that it is not apt to become permanently diminished in thickness. Preferably, the cushioning means just described is suitably housed to prevent injury from dust, water and other foreign substances, and to this end, the upper bearing member 15 is herein provided with chambers 48, in which the washers 44 and 46 are received. Lubrication for the trunnions and trunnion bearings is herein provided for by suitable oil cups 50.

It should now be evident that the described mounting permits certain relative vertical movement of the frame and radiator cushioned at both ends of the travel, thereby absorbing shocks which would otherwise be transmitted to the radiator and lamps. Frame distortions are taken care of, thereby preventing danger of injury to the radiator by relative vertical movement or separation of the bearing members 18 and 20 in opposition to the springs 34. Moreover, the bearings are, or may be, self-adjusting, because the springs urge the bearing members toward each other.

Figure 4:
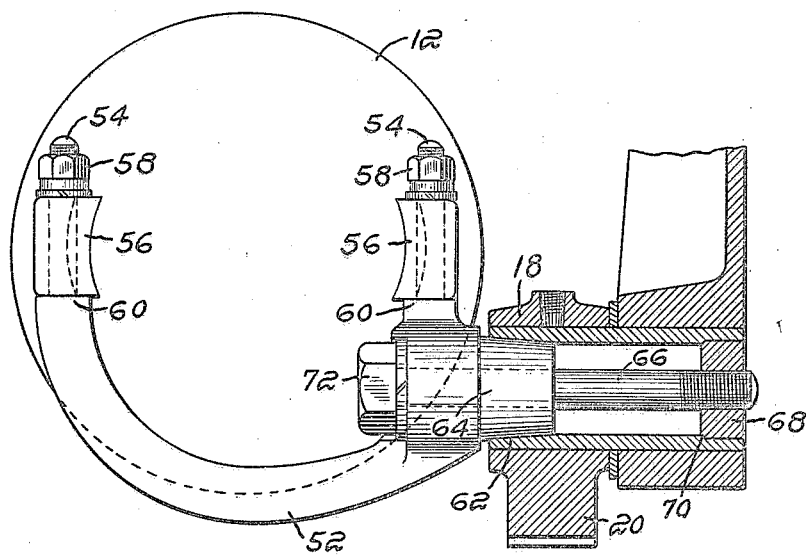
Fig. 4 is a sectional view on an enlarged scale on line 4—4 of Fig. 2.

Referring now to the details of the lamp mountings per se, each mounting herein comprises a yoke 52 (see Fig. 4), having a pair of vertical stems 54 received in lugs 56 on the lamp, said stems being threaded to receive nuts 58, which clamp the lugs against shoulders 60 formed on the yoke.

The yoke is suitably mounted on the radiator trunnion, preferably being pivoted thereon to turn about the axis thereof, as by providing the trunnion with a tapered socket 62, which receives a correspondingly tapered boss 64 formed on the yoke. The boss is normally secured against turning movement in the socket by appropriate means, herein a bolt 66, having a nut 68 arranged to draw the boss firmly into its socket. Preferably, the bolt extends axially through the boss and the trunnion, and the nut is suitably fixed in the latter against turning movement, as by having a force fit in the bore of the trunnion. The latter is preferably provided with a slight shoulder 70 to limit inward movement of the nut. The bolt is provided with a suitable head 72 which is readily accessible (see Fig. 2) for manipulation, since it is disposed at one side of the yoke,— that is to say, in offset relation therewith.

The beams of light from the lamps may be angularly adjusted about the axes of the trunnions by simply loosening the bolts and tilting the lamps, after which the bolts are again tightened to clamp the yokes. Since the trunnions are resiliently supported, the lamps are cushioned against road shocks, and less likely to be injured.

Having thus described one specific embodiment of my invention, but without limiting myself thereto, what I claim and desire to secure by Letters Patent is:

1. In a motor vehicle, the combination of a frame, a radiator, a pair of trunnions supporting said radiator on said frame, and a pair of lamps, one supported on each trunnion.

2. In a motor vehicle, the combination of a frame, a radiator, a pair of trunnions supporting said radiator on said frame, and a pair of lamps, one supported on each trunnion, and mounted for adjustment about the axis thereof.

3. In a motor vehicle, the combination of a frame, a radiator, a pair of trunnions supporting said radiator on said frame, cushioning means interposed between said trunnions and said frame, and a pair of lamps, one supported on each trunnion.

4. In a motor vehicle, the combination of a frame, a radiator, a pair of trunnions supporting said radiator on said frame, a pair of lamps, and a pair of lamp mountings supported on said trunnions, respectively, for adjustment about the axis thereof and having means to secure the same in the desired position of adjustment.

In testimony whereof, I have signed my name to this specification.

FRANS G. ALBORN.